(12) United States Patent
Pan et al.

(10) Patent No.: US 9,514,773 B2
(45) Date of Patent: Dec. 6, 2016

(54) HEAD STACK ASSEMBLY WITH A FLEXIBLE PRINTED CIRCUIT HAVING A MOUTH CENTERED BETWEEN ARMS

(71) Applicant: Western Digital Technologies, Inc., Irvine, CA (US)

(72) Inventors: Tzong-Shii Pan, San Jose, CA (US); Shufun Ho, Fremont, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/954,486

(22) Filed: Nov. 30, 2015

(65) Prior Publication Data

US 2016/0086624 A1    Mar. 24, 2016

Related U.S. Application Data

(63) Continuation of application No. 12/195,288, filed on Aug. 20, 2008, now Pat. No. 9,324,346.

(51) Int. Cl.
*G11B 5/48* (2006.01)

(52) U.S. Cl.
CPC ............ *G11B 5/486* (2013.01); *G11B 5/4826* (2013.01); *G11B 5/4833* (2013.01); *G11B 5/4846* (2013.01); *G11B 5/4853* (2013.01)

(58) Field of Classification Search
CPC ........................... G11B 5/4846; G11B 5/4853
USPC ................. 360/264.2, 266.3, 245.9
See application file for complete search history.

(56) References Cited

U.S. PATENT DOCUMENTS

| | | |
|---|---|---|
| 5,235,482 A | 8/1993 | Schmitz |
| 5,422,764 A | 6/1995 | McIlvanie |
| 5,668,684 A | 9/1997 | Palmer et al. |
| 5,872,687 A | 2/1999 | Arya et al. |
| 5,903,413 A | 5/1999 | Brooks, Jr. et al. |
| 6,046,889 A | 4/2000 | Berding et al. |
| 6,052,890 A | 4/2000 | Malagrino, Jr. et al. |
| 6,061,206 A | 5/2000 | Foisy et al. |
| 6,101,876 A | 8/2000 | Brooks et al. |
| 6,134,770 A | 10/2000 | Heeren et al. |

(Continued)

OTHER PUBLICATIONS

Tzong-Shii Pan, et al., U.S. Appl. No. 12/195,288, filed Aug. 20, 2008, 16 pages.

(Continued)

*Primary Examiner* — Jefferson Evans (57) ABSTRACT

A head stack assembly (HSA) includes a flexible printed circuit (FPC) having a mouth with an upper mouth edge and a lower mouth edge. The FPC includes a first plurality of conductive terminals immediately adjacent the upper mouth edge and a second plurality of conductive terminals immediately adjacent the lower mouth edge. The mouth is bisected by a mouth centerline that is substantially parallel to and substantially equidistant from first and second actuator arms of the HSA. A head gimbal assembly (HGA) is attached to each of the first and second actuator arms. Each HGA includes a flexure tail laminate having a dielectric layer disposed between a plurality of conductive traces and a structural layer. The plurality of conductive traces is electrically connected to either the first or second plurality of conductive terminals via a plurality of openings in the structural layer and in the dielectric layer.

11 Claims, 4 Drawing Sheets

(56) References Cited

U.S. PATENT DOCUMENTS

| | | |
|---|---|---|
| 6,145,188 A | 11/2000 | Brooks, Jr. et al. |
| 6,147,831 A | 11/2000 | Kennedy et al. |
| 6,151,189 A | 11/2000 | Brooks |
| 6,151,197 A | 11/2000 | Larson et al. |
| 6,185,067 B1 | 2/2001 | Chamberlain |
| 6,185,074 B1 | 2/2001 | Wang et al. |
| 6,185,075 B1 | 2/2001 | Tsujino et al. |
| 6,208,486 B1 | 3/2001 | Gustafson et al. |
| 6,212,046 B1 | 4/2001 | Albrecht et al. |
| 6,215,616 B1 | 4/2001 | Phan et al. |
| 6,272,694 B1 | 8/2001 | Knoth |
| 6,288,866 B1 | 9/2001 | Butler et al. |
| 6,292,333 B1 | 9/2001 | Blumentritt et al. |
| 6,344,950 B1 | 2/2002 | Watson et al. |
| 6,349,464 B1 | 2/2002 | Codilian et al. |
| 6,360,426 B1 | 3/2002 | Summers et al. |
| 6,388,873 B1 | 5/2002 | Brooks et al. |
| 6,399,889 B1 | 6/2002 | Korkowski et al. |
| 6,417,979 B1 | 7/2002 | Patton, III et al. |
| 6,421,208 B1 | 7/2002 | Oveyssi |
| 6,441,998 B1 | 8/2002 | Abrahamson |
| 6,462,914 B1 | 10/2002 | Oveyssi et al. |
| 6,466,398 B1 | 10/2002 | Butler et al. |
| 6,469,871 B1 | 10/2002 | Wang |
| 6,502,300 B1 | 1/2003 | Casey et al. |
| 6,519,116 B1 | 2/2003 | Lin et al. |
| 6,529,345 B1 | 3/2003 | Butler et al. |
| 6,529,351 B1 | 3/2003 | Oveyssi et al. |
| 6,535,358 B1 | 3/2003 | Hauert et al. |
| 6,545,382 B1 | 4/2003 | Bennett |
| 6,549,381 B1 | 4/2003 | Watson |
| 6,560,065 B1 | 5/2003 | Yang et al. |
| 6,571,460 B1 | 6/2003 | Casey et al. |
| 6,574,073 B1 | 6/2003 | Hauert et al. |
| 6,580,574 B1 | 6/2003 | Codilian |
| 6,594,111 B1 | 7/2003 | Oveyssi et al. |
| 6,603,620 B1 | 8/2003 | Berding |
| 6,618,222 B1 | 9/2003 | Watkins et al. |
| 6,624,966 B1 | 9/2003 | Ou-Yang et al. |
| 6,624,980 B1 | 9/2003 | Watson et al. |
| 6,624,983 B1 | 9/2003 | Berding |
| 6,628,473 B1 | 9/2003 | Codilian et al. |
| 6,634,086 B2 | 10/2003 | Korkowski et al. |
| 6,654,200 B1 | 11/2003 | Alexander et al. |
| 6,657,811 B1 | 12/2003 | Codilian |
| 6,661,597 B1 | 12/2003 | Codilian et al. |
| 6,661,603 B1 | 12/2003 | Watkins et al. |
| 6,674,600 B1 | 1/2004 | Codilian et al. |
| 6,690,637 B1 | 2/2004 | Codilian |
| 6,693,767 B1 | 2/2004 | Butler |
| 6,693,773 B1 | 2/2004 | Sassine |
| 6,697,217 B1 | 2/2004 | Codilian |
| 6,698,286 B1 | 3/2004 | Little et al. |
| 6,700,736 B1 | 3/2004 | Wu et al. |
| 6,704,167 B1 | 3/2004 | Scura et al. |
| 6,707,637 B1 | 3/2004 | Codilian et al. |
| 6,707,641 B1 | 3/2004 | Oveyssi et al. |
| 6,710,980 B1 | 3/2004 | Hauert et al. |
| 6,710,981 B1 | 3/2004 | Oveyssi et al. |
| 6,728,062 B1 | 4/2004 | Ou-Yang et al. |
| 6,728,063 B1 | 4/2004 | Gustafson et al. |
| 6,731,470 B1 | 5/2004 | Oveyssi |
| 6,735,033 B1 | 5/2004 | Codilian et al. |
| 6,741,428 B1 | 5/2004 | Oveyssi |
| 6,751,051 B1 | 6/2004 | Garbarino |
| 6,754,042 B1 | 6/2004 | Chiou et al. |
| 6,757,132 B1 | 6/2004 | Watson et al. |
| 6,759,784 B1 | 7/2004 | Gustafson et al. |
| 6,781,780 B1 | 8/2004 | Codilian |
| 6,781,787 B1 | 8/2004 | Codilian et al. |
| 6,781,791 B1 | 8/2004 | Griffin et al. |
| 6,790,066 B1 | 9/2004 | Klein |
| 6,791,791 B1 | 9/2004 | Alfred et al. |
| 6,791,801 B1 | 9/2004 | Oveyssi |
| 6,795,262 B1 | 9/2004 | Codilian et al. |
| 6,798,603 B1 | 9/2004 | Singh et al. |
| 6,801,389 B1 | 10/2004 | Berding et al. |
| 6,801,404 B1 | 10/2004 | Oveyssi |
| 6,816,342 B1 | 11/2004 | Oveyssi |
| 6,816,343 B1 | 11/2004 | Oveyssi |
| 6,825,622 B1 | 11/2004 | Ryan et al. |
| 6,826,009 B1 | 11/2004 | Scura et al. |
| 6,831,810 B1 | 12/2004 | Butler et al. |
| 6,839,199 B1 | 1/2005 | Alexander, Jr. et al. |
| 6,844,996 B1 | 1/2005 | Berding et al. |
| 6,847,504 B1 | 1/2005 | Bennett et al. |
| 6,847,506 B1 | 1/2005 | Lin et al. |
| 6,856,491 B1 | 2/2005 | Oveyssi |
| 6,856,492 B2 | 2/2005 | Oveyssi |
| 6,862,154 B1 | 3/2005 | Subrahmanyam et al. |
| 6,862,156 B1 | 3/2005 | Lin et al. |
| 6,862,176 B1 | 3/2005 | Codilian et al. |
| 6,865,049 B1 | 3/2005 | Codilian et al. |
| 6,865,055 B1 | 3/2005 | Ou-Yang et al. |
| 6,867,946 B1 | 3/2005 | Berding et al. |
| 6,867,950 B1 | 3/2005 | Lin |
| 6,876,514 B1 | 4/2005 | Little |
| 6,879,466 B1 | 4/2005 | Oveyssi et al. |
| 6,888,697 B1 | 5/2005 | Oveyssi |
| 6,888,698 B1 | 5/2005 | Berding et al. |
| 6,891,696 B1 | 5/2005 | Ou-Yang et al. |
| 6,898,052 B1 | 5/2005 | Oveyssi |
| 6,900,961 B1 | 5/2005 | Butler |
| 6,906,880 B1 | 6/2005 | Codilian |
| 6,906,897 B1 | 6/2005 | Oveyssi |
| 6,908,330 B2 | 6/2005 | Garrett et al. |
| 6,922,308 B1 | 7/2005 | Butler |
| 6,930,848 B1 | 8/2005 | Codilian et al. |
| 6,930,857 B1 | 8/2005 | Lin et al. |
| 6,934,126 B1 | 8/2005 | Berding et al. |
| 6,937,444 B1 | 8/2005 | Oveyssi |
| 6,940,698 B2 | 9/2005 | Lin et al. |
| 6,941,642 B1 | 9/2005 | Subrahmanyam et al. |
| 6,947,251 B1 | 9/2005 | Oveyssi et al. |
| 6,950,275 B1 | 9/2005 | Ali et al. |
| 6,950,284 B1 | 9/2005 | Lin |
| 6,952,318 B1 | 10/2005 | Ngo |
| 6,954,329 B1 | 10/2005 | Ojeda et al. |
| 6,958,884 B1 | 10/2005 | Ojeda et al. |
| 6,958,890 B1 | 10/2005 | Lin et al. |
| 6,961,212 B1 | 11/2005 | Gustafson et al. |
| 6,961,218 B1 | 11/2005 | Lin et al. |
| 6,963,469 B1 | 11/2005 | Gustafson et al. |
| 6,965,500 B1 | 11/2005 | Hanna et al. |
| 6,967,800 B1 | 11/2005 | Chen et al. |
| 6,967,804 B1 | 11/2005 | Codilian |
| 6,970,329 B1 | 11/2005 | Oveyssi et al. |
| 6,972,924 B1 | 12/2005 | Chen et al. |
| 6,972,926 B1 | 12/2005 | Codilian |
| 6,975,476 B1 | 12/2005 | Berding |
| 6,979,931 B1 | 12/2005 | Gustafson et al. |
| 6,980,391 B1 | 12/2005 | Haro |
| 6,980,401 B1 | 12/2005 | Narayanan et al. |
| 6,982,853 B1 | 1/2006 | Oveyssi et al. |
| 6,989,953 B1 | 1/2006 | Codilian |
| 6,990,727 B1 | 1/2006 | Butler et al. |
| 6,996,893 B1 | 2/2006 | Ostrander et al. |
| 7,000,309 B1 | 2/2006 | Klassen et al. |
| 7,006,324 B1 | 2/2006 | Oveyssi et al. |
| 7,013,731 B1 | 3/2006 | Szeremeta et al. |
| 7,031,104 B1 | 4/2006 | Butt et al. |
| 7,035,053 B1 | 4/2006 | Oveyssi et al. |
| 7,050,270 B1 | 5/2006 | Oveyssi et al. |
| 7,057,852 B1 | 6/2006 | Butler et al. |
| 7,062,837 B1 | 6/2006 | Butler |
| 7,064,921 B1 | 6/2006 | Yang et al. |
| 7,064,922 B1 | 6/2006 | Alfred et al. |
| 7,064,932 B1 | 6/2006 | Lin et al. |
| 7,085,098 B1 | 8/2006 | Yang et al. |
| 7,085,108 B1 | 8/2006 | Oveyssi et al. |
| 7,092,216 B1 | 8/2006 | Chang et al. |
| 7,092,251 B1 | 8/2006 | Henry |
| 7,099,099 B1 | 8/2006 | Codilian et al. |
| 7,110,222 B2 | 9/2006 | Erpelding |

(56) References Cited

U.S. PATENT DOCUMENTS

| | | |
|---|---|---|
| 7,113,371 B1 | 9/2006 | Hanna et al. |
| 7,142,397 B1 | 11/2006 | Venk |
| 7,145,753 B1 | 12/2006 | Chang et al. |
| RE39,478 E | 1/2007 | Hatch et al. |
| 7,161,768 B1 | 1/2007 | Oveyssi |
| 7,161,769 B1 | 1/2007 | Chang et al. |
| 7,180,711 B1 | 2/2007 | Chang et al. |
| 7,193,819 B1 | 3/2007 | Chen et al. |
| 7,209,317 B1 | 4/2007 | Berding et al. |
| 7,209,319 B1 | 4/2007 | Watkins et al. |
| D542,289 S | 5/2007 | Diebel |
| 7,212,377 B1 | 5/2007 | Ou-Yang et |
| 7,215,513 B1 | 5/2007 | Chang et al. |
| 7,215,514 B1 | 5/2007 | Yang et al. |
| 7,224,551 B1 | 5/2007 | Ou-Yang et al. |
| D543,981 S | 6/2007 | Diebel |
| 7,227,725 B1 | 6/2007 | Chang et al. |
| 7,239,475 B1 | 7/2007 | Lin et al. |
| 7,271,978 B1 | 9/2007 | Santini et al. |
| 7,274,534 B1 | 9/2007 | Choy et al. |
| 7,280,311 B1 | 10/2007 | Ou-Yang et al. |
| 7,280,317 B1 | 10/2007 | Little et al. |
| 7,280,319 B1 | 10/2007 | McNab |
| 7,292,406 B1 | 11/2007 | Huang |
| 7,298,584 B1 | 11/2007 | Yamada et al. |
| 7,327,537 B1 | 2/2008 | Oveyssi |
| 7,339,268 B1 | 3/2008 | Ho et al. |
| 7,342,746 B1 | 3/2008 | Lin |
| RE40,203 E | 4/2008 | Hatch et al. |
| 7,353,524 B1 | 4/2008 | Lin et al. |
| 7,369,368 B1 | 5/2008 | Mohajerani |
| 7,372,670 B1 | 5/2008 | Oveyssi |
| 7,375,929 B1 | 5/2008 | Chang et al. |
| 7,379,266 B1 | 5/2008 | Ou-Yang et al. |
| 7,381,904 B1 | 6/2008 | Codilian |
| 7,385,784 B1 | 6/2008 | Berding et al. |
| 7,388,731 B1 | 6/2008 | Little et al. |
| 7,420,771 B1 | 9/2008 | Hanke et al. |
| 7,434,987 B1 | 10/2008 | Gustafson et al. |
| 7,436,625 B1 | 10/2008 | Chiou et al. |
| 7,440,234 B1 | 10/2008 | Cheng et al. |
| 7,477,488 B1 | 1/2009 | Zhang et al. |
| 7,477,489 B1 | 1/2009 | Chen et al. |
| 7,484,291 B1 | 2/2009 | Ostrander et al. |
| 7,505,231 B1 | 3/2009 | Golgolab et al. |
| 7,529,064 B1 | 5/2009 | Huang et al. |
| 7,538,981 B1 | 5/2009 | Pan |
| 7,561,374 B1 | 7/2009 | Codilian et al. |
| 7,567,410 B1 | 7/2009 | Zhang et al. |
| 7,576,955 B1 | 8/2009 | Yang et al. |
| 7,593,181 B1 | 9/2009 | Tsay et al. |
| 7,605,999 B1 | 10/2009 | Kung et al. |
| 7,609,486 B1 | 10/2009 | Little |
| 7,610,672 B1 | 11/2009 | Liebman |
| 7,633,721 B1 | 12/2009 | Little et al. |
| 7,633,722 B1 | 12/2009 | Larson et al. |
| 7,656,609 B1 | 2/2010 | Berding et al. |
| 7,660,075 B1 | 2/2010 | Lin et al. |
| 7,672,083 B1 | 3/2010 | Yu et al. |
| 7,684,155 B1 | 3/2010 | Huang et al. |
| 7,686,555 B1 | 3/2010 | Larson et al. |
| 7,709,078 B1 | 5/2010 | Sevier et al. |
| 7,715,149 B1 | 5/2010 | Liebman et al. |
| 7,729,091 B1 | 6/2010 | Huang et al. |
| 7,751,145 B1 | 7/2010 | Lin et al. |
| 7,826,177 B1 | 11/2010 | Zhang et al. |
| 7,852,601 B1 | 12/2010 | Little |
| 7,864,488 B1 | 1/2011 | Pan |
| 7,898,770 B1 | 3/2011 | Zhang et al. |
| 7,903,369 B1 | 3/2011 | Codilian et al. |
| 7,907,369 B1 | 3/2011 | Pan |
| 7,911,742 B1 | 3/2011 | Chang et al. |
| 7,926,167 B1 | 4/2011 | Liebman et al. |
| 7,957,095 B1 | 6/2011 | Tsay et al. |
| 7,957,102 B1 | 6/2011 | Watson et al. |
| 7,961,436 B1 | 6/2011 | Huang et al. |
| 8,004,782 B1 | 8/2011 | Nojaba et al. |
| 8,009,384 B1 | 8/2011 | Little |
| 8,018,687 B1 | 9/2011 | Little et al. |
| 8,031,431 B1 | 10/2011 | Berding et al. |
| 8,064,168 B1 | 11/2011 | Zhang et al. |
| 8,064,170 B1 | 11/2011 | Pan |
| 8,068,314 B1 | 11/2011 | Pan et al. |
| 8,081,401 B1 | 12/2011 | Huang et al. |
| 8,100,017 B1 | 1/2012 | Blick et al. |
| 8,116,038 B1 | 2/2012 | Zhang et al. |
| 8,125,740 B1 | 2/2012 | Yang et al. |
| 8,142,671 B1 | 3/2012 | Pan |
| 8,156,633 B1 | 4/2012 | Foisy |
| 8,159,785 B1 | 4/2012 | Lee et al. |
| 8,189,298 B1 | 5/2012 | Lee et al. |
| 8,194,348 B2 | 6/2012 | Jacoby et al. |
| 8,194,354 B1 | 6/2012 | Zhang et al. |
| 8,194,355 B1 | 6/2012 | Pan et al. |
| 8,203,806 B2 | 6/2012 | Larson et al. |
| 8,223,453 B1 | 7/2012 | Norton et al. |
| 8,228,631 B1 | 7/2012 | Tsay et al. |
| 8,233,239 B1 | 7/2012 | Teo et al. |
| 8,248,733 B1 | 8/2012 | Radavicius et al. |
| 8,259,417 B1 | 9/2012 | Ho et al. |
| 8,274,760 B1 | 9/2012 | Zhang et al. |
| 8,276,256 B1 | 10/2012 | Zhang et al. |
| 8,279,560 B1 | 10/2012 | Pan |
| 8,284,514 B1 | 10/2012 | Garbarino |
| 8,289,646 B1 | 10/2012 | Heo et al. |
| 8,300,352 B1 | 10/2012 | Larson et al. |
| 8,305,708 B2 | 11/2012 | Tacklind |
| 8,320,086 B1 | 11/2012 | Moradnouri et al. |
| 8,322,021 B1 | 12/2012 | Berding et al. |
| 8,345,387 B1 | 1/2013 | Nguyen |
| 8,363,351 B1 | 1/2013 | Little |
| 8,369,044 B2 | 2/2013 | Howie et al. |
| 8,411,389 B1 | 4/2013 | Tian et al. |
| 8,416,522 B1 | 4/2013 | Schott et al. |
| 8,416,534 B1 | 4/2013 | Heo et al. |
| 8,422,171 B1 | 4/2013 | Guerini |
| 8,422,175 B1 | 4/2013 | Oveyssi |
| 8,432,641 B1 | 4/2013 | Nguyen |
| 8,437,101 B1 | 5/2013 | German et al. |
| 8,438,721 B1 | 5/2013 | Sill |
| 8,446,688 B1 | 5/2013 | Quines et al. |
| 8,451,559 B1 | 5/2013 | Berding et al. |
| 8,467,153 B1 | 6/2013 | Pan et al. |
| 8,472,131 B1 | 6/2013 | Ou-Yang et al. |
| 8,477,460 B1 | 7/2013 | Liebman |
| 8,488,270 B2 | 7/2013 | Brause et al. |
| 8,488,280 B1 | 7/2013 | Myers et al. |
| 8,499,652 B1 | 8/2013 | Tran et al. |
| 8,514,514 B1 | 8/2013 | Berding et al. |
| 8,530,032 B1 | 9/2013 | Sevier et al. |
| 8,542,465 B2 | 9/2013 | Liu et al. |
| 8,547,664 B1 | 10/2013 | Foisy et al. |
| 8,553,356 B1 | 10/2013 | Heo et al. |
| 8,553,366 B1 | 10/2013 | Hanke |
| 8,553,367 B1 | 10/2013 | Foisy et al. |
| 8,616,900 B1 | 12/2013 | Lion |
| 8,665,555 B1 | 3/2014 | Young et al. |
| 8,667,667 B1 | 3/2014 | Nguyen et al. |
| 8,693,139 B2 | 4/2014 | Tian et al. |
| 8,693,140 B1 | 4/2014 | Weiher et al. |
| 8,699,179 B1 | 4/2014 | Golgolab et al. |
| 8,702,998 B1 | 4/2014 | Guerini |
| 8,705,201 B2 | 4/2014 | Casey et al. |
| 8,705,209 B2 | 4/2014 | Seymour et al. |
| 8,717,706 B1 | 5/2014 | German et al. |
| 8,743,509 B1 | 6/2014 | Heo et al. |
| 8,755,148 B1 | 6/2014 | Howie et al. |
| 8,756,776 B1 | 6/2014 | Chen et al. |
| 8,760,800 B1 | 6/2014 | Brown et al. |
| 8,760,814 B1 | 6/2014 | Pan et al. |
| 8,760,816 B1 | 6/2014 | Myers et al. |
| 8,773,812 B1 | 7/2014 | Gustafson et al. |
| 8,780,491 B1 | 7/2014 | Perlas et al. |
| 8,780,504 B1 | 7/2014 | Teo et al. |

(56) References Cited

U.S. PATENT DOCUMENTS

| | | | |
|---|---|---|---|
| 8,792,205 B1 | 7/2014 | Boye-Doe et al. | |
| 8,797,677 B2 | 8/2014 | Heo et al. | |
| 8,797,689 B1 | 8/2014 | Pan et al. | |
| 8,824,095 B1 | 9/2014 | Dougherty | |
| 8,824,098 B1 | 9/2014 | Huang et al. | |
| 2005/0268456 A1* | 12/2005 | Hashimoto | G11B 5/4813 29/603.03 |
| 2006/0146447 A1* | 7/2006 | Ho | G11B 5/4813 360/264.2 |
| 2006/0246748 A1* | 11/2006 | Suzuki | G11B 5/4833 439/67 |
| 2007/0153427 A1 | 7/2007 | Izumi et al. | |
| 2007/0279805 A1* | 12/2007 | Komura | G11B 5/486 360/245.9 |
| 2007/0279807 A1 | 12/2007 | Kobayashi et al. | |
| 2008/0225439 A1 | 9/2008 | Komura | |
| 2009/0244782 A1* | 10/2009 | Kagawa | G11B 5/4846 360/245.8 |
| 2011/0109996 A1* | 5/2011 | Nakamura | G11B 5/4813 360/234.5 |
| 2011/0212281 A1 | 9/2011 | Jacoby et al. | |
| 2012/0075741 A1* | 3/2012 | Ho | G11B 5/5569 360/75 |
| 2013/0038964 A1 | 2/2013 | Garbarino et al. | |
| 2013/0091698 A1 | 4/2013 | Banshak, Jr. et al. | |
| 2013/0155546 A1 | 6/2013 | Heo et al. | |
| 2013/0290988 A1 | 10/2013 | Watson et al. | |
| 2016/0019918 A1* | 1/2016 | Juman | G11B 5/4853 360/244.2 |

OTHER PUBLICATIONS

Notice of Allowance dated Jan. 6, 2016 from U.S. Appl. No. 12/195,288, 2 pages.
Notice of Allowance dated Dec. 23, 2015 from U.S. Appl. No. 12/195,288, 7 pages.
Patent Board Decision dated Oct. 2, 2015 from U.S. Appl. No. 12/195,288, 8 pages.
Examiner's Answer to Appeal Brief dated Oct. 16, 2012 from U.S. Appl. No. 12/195,288, 5 pages.
Office Action dated Apr. 17, 2012 from U.S. Appl. No. 12/195,288, 14 pages.
Office Action dated Sep. 23, 2011 from U.S. Appl. No. 12/195,288, 10 pages.

* cited by examiner

HEAD STACK ASSEMBLY WITH A FLEXIBLE PRINTED CIRCUIT HAVING A MOUTH CENTERED BETWEEN ARMS

RELATED APPLICATION

This application is a continuation of U.S. patent application Ser. No. 12/195,288 to Tzong-Shii Pan, entitled "HEAD STACK ASSEMBLY WITH A FLEXIBLE PRINTED CIRCUIT HAVING A MOUTH CENTERED BETWEEN ARMS," filed 2008 Aug. 20, pending.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator, and each of the laminated flexures of the HGAs has a flexure tail that is electrically connected to the FPC.

Modern laminated flexures typically include conductive copper traces that are isolated from a stainless steel structural layer by a polyimide dielectric layer. So that the signals from/to the head can reach the flex cable on the actuator body, each HGA flexure includes a flexure tail that extends away from the head along the actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained to maintain proper alignment while the aforementioned electrical connections are made. Practically obtaining and maintaining such proper relative alignment in a high-volume manufacturing environment is a non-trivial challenge for manufacturers that require fast, cost-effective, and robust manufacturing processes to survive in a highly competitive industry.

Accordingly, there is a need in the art for improved HSA designs, to facilitate relative positioning and electrical connection of the conductive traces of a flexure tail to the conductive electrical terminals of an FPC during HSA manufacture.

DETAILED DESCRIPTION OF EXAMPLE EMBODIMENTS

Figure 1:
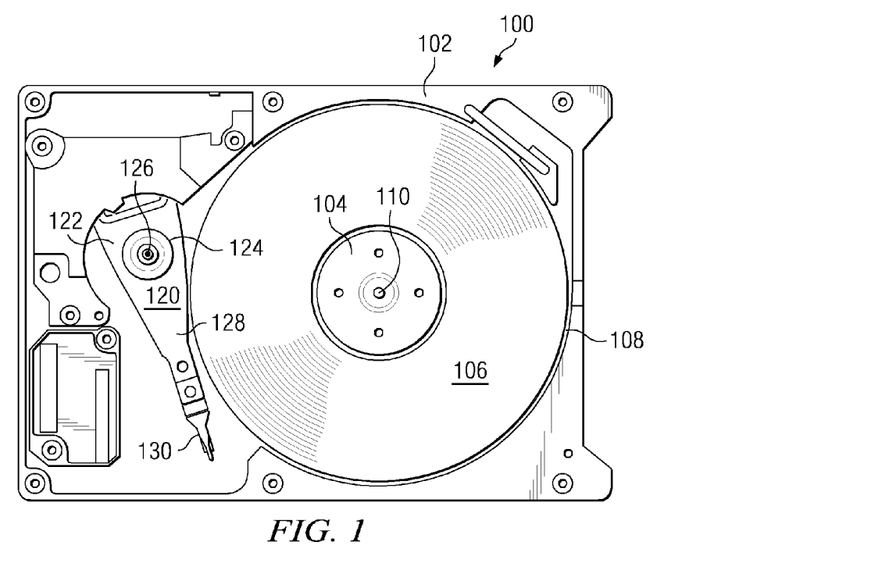
FIG. 1 is top view of a disk drive capable of incorporating an embodiment of the present invention.

FIG. 1 is top view of a disk drive 100 capable of incorporating an embodiment of the present invention. The disk drive 100 includes a disk drive base 102, a spindle 104 attached to the disk drive base 102, and at least one annular magnetic disk 106 attached to the spindle 104. The spindle motor 104 rotates the disk 106 about a spindle axis of rotation 110 (oriented in & out of the page in FIG. 1). The disk 106 contains a plurality of magnetic tracks for storing data, disposed upon opposing first and second disk surfaces of the disk 106. The disk 106 includes a disk outer edge 108 (corresponding to the outer diameter of disk 106).

The disk drive 100 further includes a head stack assembly (HSA) 120 rotatably attached to the base 102. The HSA 120 includes an actuator body 122 having a bore and a pivot bearing cartridge 124 engaged within the bore for enabling the HSA 120 to rotate relative to the base 102 about actuator pivot axis 126. The actuator pivot axis 126 (oriented in & out of the page in FIG. 1) is substantially parallel to the spindle axis of rotation 110. One or more actuator arms 128 extend from the actuator body 122, and one or two head gimbal assemblies (HGA) 130 are attached to a distal end of each actuator arm 128.

Figure 2:
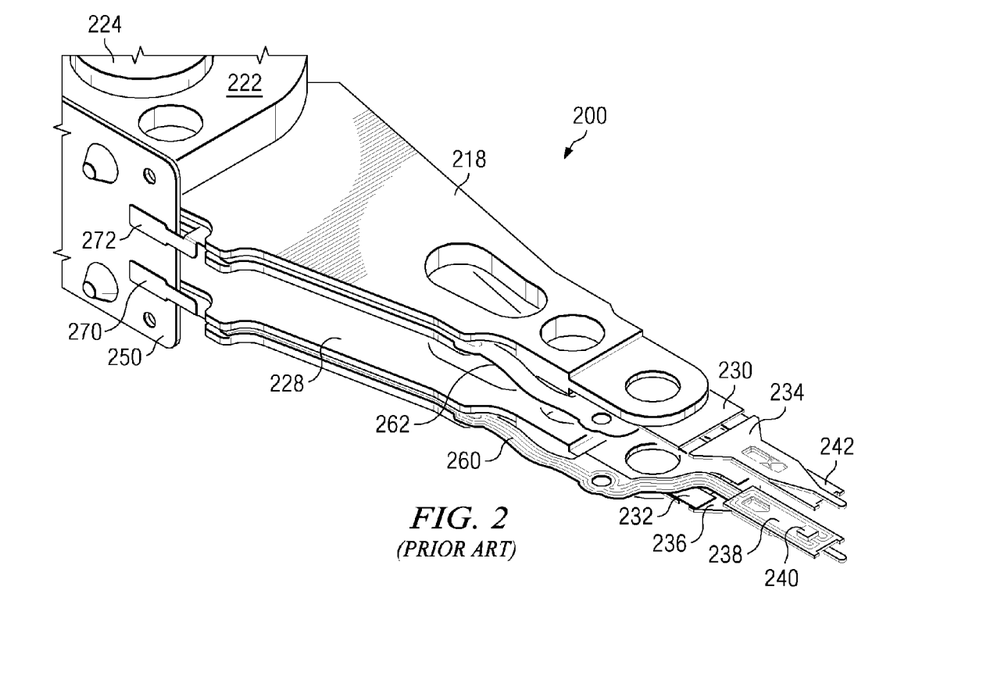
FIG. 2 is a perspective view of a head stack assembly according to the prior art.

Now referring to FIG. 2, a perspective view of a head stack assembly (HSA) 200 according to the prior art is shown. The head stack assembly 200 is electrically connected to disk drive channel and driver circuitry via a conventional flexible printed circuit (FPC) 250. The HSA 200 includes an actuator body 222 having a bore and a pivot bearing cartridge 224 engaged within the bore. Two actuator arms 218 and 228 extend from the actuator body 222. Head gimbal assembly (HGA) 230 is attached to the distal end of actuator arm 218, and HGA 232 is attached to the distal end of actuator arm 228. Each of HGAs 230 and 232 includes a head (e.g. head 240) for reading and writing data from and to a disk (e.g. disk 106). In magnetic hard disk drive applications, the head 240 comprises a body called a "slider" that carries a magnetic transducer on its trailing end (not visible given the scale of FIG. 2). The magnetic transducer may include an inductive write element and a magnetoresistive read element and during disk drive operation will be separated from the magnetic disk by a very thin hydrodynamic air bearing. The thickness of the air bearing at the location of the transducer is commonly referred to as "flying height."

Still referring to FIG. 2, HGA 230 includes a load beam 234 and HGA 232 includes a load beam 236. Each of HGAs 230 and 232 also includes a laminated flexure. For example, HGA 232 includes a laminated flexure 238 attached to the load beam 236, with the head 240 attached to the laminated flexure 238. The purpose of the load beam 236 is to provide vertical compliance for the head 240 to follow vertical undulation of the surface of an adjacent disk as it rotates, and to preload the head 240 against the adjacent surface of that disk by a preload force that is commonly referred to as the "gram load." A first purpose of the flexure 238 is to provide compliance for the head 240 to follow pitch and roll angular undulations of the surface of the disk as it rotates, while restricting relative motion between the head 240 and the load beam 236 in the lateral direction and about a yaw axis. A second purpose of the flexure 238 is to provide a plurality of electrical paths from the head 240 to the FPC 250 to facilitate signal transmission to/from the head 240.

For that second purpose, the flexure 238 includes a flexure tail 260 that extends away from the head 240 along the actuator arm 228 and ultimately attaches to the FPC 250 adjacent the actuator body 222. That is, the flexure 238 includes traces that extend from adjacent the head 240 to electrical connection points in a terminal region 270 of the flexure tail 260. Likewise, HGA 230 includes a flexure 242 that includes a flexure tail 262 that attaches to FPC 250 in a terminal region 272. As can be seen in FIG. 2, each flexure tail (e.g. flexure tail 260) is a distinct and smaller component, as compared with the FPC 250. The traces on the flexure tail 260 are electrically connected to the FPC 250, at terminal region 270 of the flexure tail 260. Methods of electrical connection of the flexure tail 260 to the FPC 250 include ultrasonic tab bonding, solder reflow, and solder jet bond (SJB).

Figure 3:
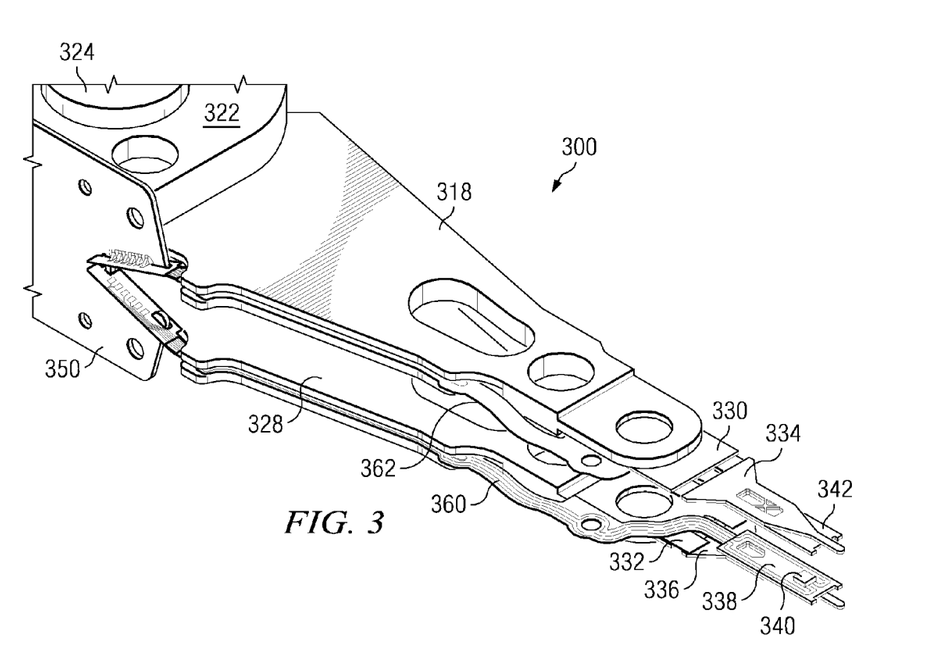
FIG. 3 is a perspective view of a head stack assembly according to an embodiment of the present invention.

Now referring to the embodiment of FIG. 3, a perspective view of a head stack assembly 300 according to an embodiment of the present invention is shown. The head stack assembly 300 is electrically connected to disk drive channel and driver circuitry via novel flexible printed circuit (FPC) 350. The HSA 300 includes an actuator body 322 having a bore and a pivot bearing cartridge 324 engaged within the bore. Two actuator arms 318 and 328 extend from the actuator body 322, but in other embodiments the HSA 300 may include a different number of actuator arms (e.g. four). Head gimbal assembly (HGA) 330 is attached to the distal end of actuator arm 318, and HGA 332 is attached to the distal end of actuator arm 328. Each of HGAs 330 and 332 includes a head (e.g. head 340) for reading and writing data from and to a disk (e.g. disk 106).

Still referring to the embodiment of FIG. 3, HGA 330 includes a load beam 334 and HGA 332 includes a load beam 336. Each of HGAs 330 and 332 also includes a laminated flexure. For example, HGA 332 includes a laminated flexure 338 attached to the load beam 336, with the head 340 attached to the laminated flexure 338. A first purpose of the flexure 338 is to provide compliance for the head 340 to follow pitch and roll angular undulations of the surface of the disk as it rotates, while restricting relative motion between the head 340 and the load beam 336 in the lateral direction and about a yaw axis. A second purpose of the flexure 338 is to provide a plurality of electrical paths from the head 340 to the FPC 350 to facilitate signal transmission to/from the head 340.

For that second purpose, the flexure 338 of the embodiment of FIG. 3 includes a flexure tail 360 that extends away from the head 340 along the actuator arm 328 and ultimately attaches to the FPC 350 adjacent the actuator body 322. Likewise, HGA 330 includes a flexure 342 that includes a flexure tail 362 that attaches to FPC 350. As can be seen in FIG. 3, each flexure tail (e.g. flexure tail 360) is a distinct and smaller component, as compared with the FPC 350. Each of the laminated flexures 338, 342 includes a plurality of electrically conductive traces that are isolated from a structural layer by a dielectric layer. For example, the conductive traces may comprise copper, the structural layer may comprise stainless steel, and the dielectric layer may comprise polyimide. Portions of the electrically conductive traces may also be coated with an insulative cover layer (e.g. a polymer layer).

Figure 4:
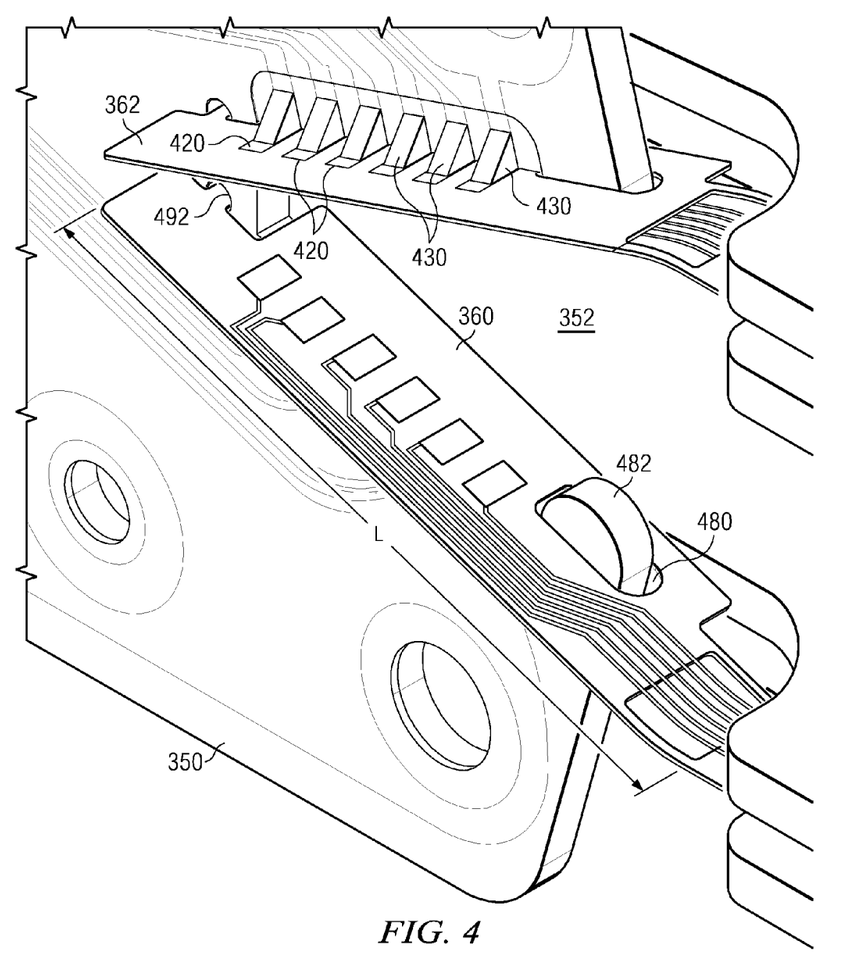
FIG. 4 depicts a close up perspective view of a portion of a head stack assembly according to an embodiment of the present invention.
Figure 5:
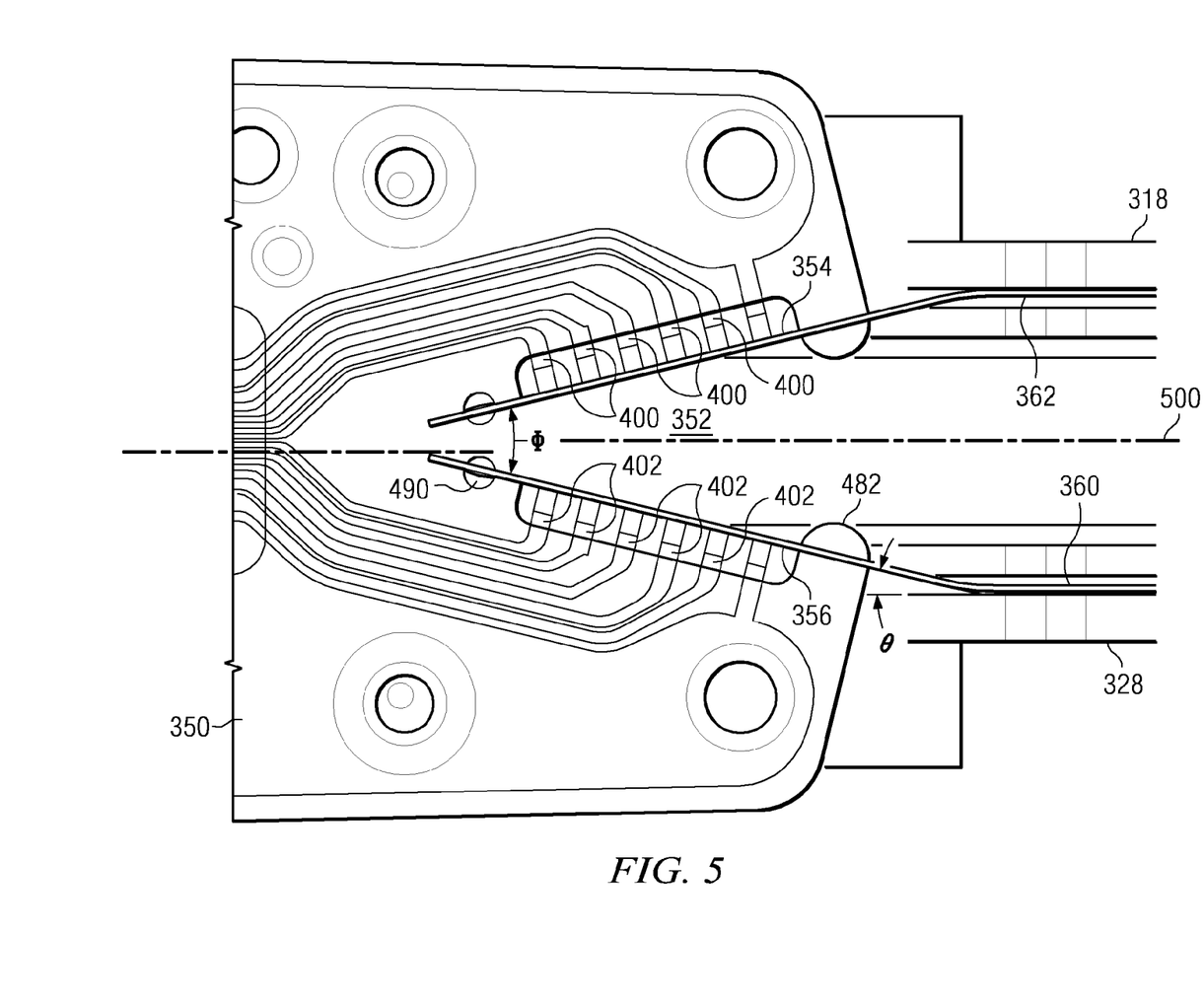
FIG. 5 depicts a close up side view of a portion of a head stack assembly according to an embodiment of the present invention.

FIG. 4 depicts a close up perspective view of a portion of a head stack assembly according to an embodiment of the present invention, and FIG. 5 depicts a close up side view of a portion of the head stack assembly of FIG. 4. In the embodiment of FIGS. 4 and 5, FPC 350 has a mouth 352 including an upper mouth edge 354 and a lower mouth edge 356. The FPC 350 includes a first plurality of conductive terminals 400 immediately adjacent the upper mouth edge 354 and a second plurality of conductive terminals 402 immediately adjacent the lower mouth edge 356. What is meant by "immediately" adjacent is that the terminals are close enough to the mouth edge to enable a 90-degree electrical bond/connection to be made between each terminal and a corresponding conductive trace of the corresponding flexure tail. Note that as used herein, not just any portion of a conductor may be considered as a "terminal"; rather, a terminal is considered to the terminus of a conductor of the FPC (i.e. where the conductor terminates and where an electrical connection to that conductor of the FPC is made). The mouth 352 defines and is bisected by a mouth centerline 500 disposed equidistant from the upper mouth edge 354 and the lower mouth edge 356. The mouth centerline 500 is substantially parallel to and substantially equidistant from the first and second actuator arms 318 and 328.

This positioning of the mouth centerline 500 may enable increased vertical deflection of the flexure tails, which may provide increased vertical preload during electrical connection (e.g. more reliable physical contact of solder bumps on mating parts during a solder reflow process). For example in the embodiment of FIG. 5, the flexure tail 362 includes a bend that defines an angular change $\theta$, and preferably $\theta$ is in the range 6-20 degrees. Likewise, the flexure tail 360 includes a bend that defines an angular change $\theta$ that is preferably in the range 6-20 degrees. Also, in the embodiment of FIG. 5, the upper mouth edge 354 and the lower mouth edge 356 are at an angle $\phi$ relative to each other. It can be seen that, optionally but not necessarily in the embodiment of FIG. 5, $\phi=20$. Preferably $\phi$ is in the range 12-40 degrees. In the embodiment of FIG. 4, the flexure tail 360 has an unsupported portion having a length L. Preferably, L is greater than 4 mm. The bends in the flexure tails and the relative angles of the mouth edges may serve to adequately preload the flexure tails against the upper and lower mouth edges, facilitating reliable contact between mating parts during the electrical connection process.

However, this positioning of the mouth 352, in a position that is substantially equidistant from the first and second actuator arms 318 and 328, stands in contradiction to conventional wisdom, which would instead lead to an alignment of the center of the mouth with either the first or second actuator arm to facilitate electrical interconnection (because the sides of the flexure tails that have conductive traces would then face towards, rather than away from, the FPC 350).

The consequences of this contradiction with conventional wisdom may be at least partially mitigated in the embodiment of FIG. 4 by specified openings in the flexure tails. Specifically, in the embodiment of FIG. 4, the plurality of conductive traces of flexure tail 362 are electrically connected to the first plurality of conductive terminals 400 via a first plurality of openings 420 in the structural layer and the dielectric layer of flexure tail 362. For example, the plurality of conductive traces of flexure tail 362 may be electrically connected to the first plurality of conductive terminals 400 via solder connections 430 through openings 420 in the structural layer and the dielectric layer of flexure tail 362. Likewise, the plurality of conductive traces of flexure tail 360 may be electrically connected to the second plurality of conductive terminals 402 via a second plurality of openings (not visible in FIG. 4) in the structural layer and the dielectric layer of flexure tail 360. These openings in the structural and dielectric layers of the flexure tails enable the mouth 352 to be positioned and aligned against conventional wisdom as described previously.

In the embodiment of FIGS. 4 and 5, the flexure tail 360 includes a slot 480, and tab 482 protrudes from the lower mouth edge 356 into the slot 480. Also in the embodiment of FIGS. 4 and 5, the FPC 350 includes a hole 490 and the flexure tail 360 includes a tab 492 that protrudes from the flexure tail 360 into the hole 490. These tabs, slots, and holes, shown in FIGS. 4 and 5, may serve to position the flexure tails relative to the upper and lower mouth edges, facilitating assembly.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A head stack assembly (HSA) comprising:
   first and second actuator arms, the first actuator arm being substantially parallel to the second actuator arm;
   a first head gimbal assembly (HGA) attached to the first actuator arm, the first HGA including a first flexure tail laminate having a first dielectric layer separating a first plurality of conductive traces from a first structural layer;
   a second HGA attached to the second actuator arm, the second HGA including a second flexure tail laminate having a second dielectric layer separating a second plurality of conductive traces from a second structural layer; and
   a flexible printed circuit (FPC) having a mouth, the mouth including an upper mouth edge and a lower mouth edge, the FPC including a first plurality of conductive terminals immediately adjacent the upper mouth edge and a second plurality of conductive terminals immediately adjacent the lower mouth edge, the mouth defining and being bisected by a mouth centerline, the mouth centerline being spaced from and substantially parallel to and substantially equidistant from the first and second actuator arms;
   wherein the first plurality of conductive traces is electrically connected to the first plurality of conductive terminals via a first plurality of openings in the first structural layer and in the first dielectric layer, and the second plurality of conductive traces is electrically connected to the second plurality of conductive terminals via a second plurality of openings in the second structural layer and in the second dielectric layer.

2. The HSA of claim 1 wherein the mouth centerline is disposed equidistant from the upper mouth edge and the lower mouth edge.

3. The HSA of claim 1 wherein the first plurality of conductive traces is soldered to the first plurality of conductive terminals through the first plurality of openings.

4. The HSA of claim 1 wherein the second plurality of conductive traces is soldered to the second plurality of conductive terminals through the second plurality of openings.

5. The HSA of claim 1 wherein the first flexure tail laminate includes a bend that defines an angular change in the range 6-20 degrees.

6. The HSA of claim 1 wherein the second flexure tail laminate has an unsupported portion having a length greater than 4 mm.

7. The HSA of claim 1 wherein the upper mouth edge and the lower mouth edge are at an angle relative to each other in the range 12-40 degrees.

8. The HSA of claim 1 further comprising a slot through the second flexure tail laminate and a corresponding tab protruding from the lower mouth edge into the slot.

9. The HSA of claim 1 further comprising a hole in the FPC and a corresponding tab protruding from the second flexure tail laminate into the hole.

10. The HSA of claim 1 further including a means for preloading the first and second flexure tails against the upper and lower mouth edges, respectively.

11. The HSA of claim 1 further including a means for positioning the first and second flexure tails relative to the upper and lower mouth edges, respectively.

* * * * *